US012668048B1

(12) United States Patent
Wang

(10) Patent No.: US 12,668,048 B1
(45) Date of Patent: Jun. 30, 2026

(54) PRESSURE BALANCED FILM LAMINATOR AND METHODS FOR MAKING AND USING

(71) Applicant: Jiansheng Wang, The Colony, TX (US)

(72) Inventor: Jiansheng Wang, The Colony, TX (US)

(73) Assignee: Scienstry, Inc., Dallas, TX (US)

( * ) Notice: Subject to any disclaimer, the term of this patent is extended or adjusted under 35 U.S.C. 154(b) by 0 days.

(21) Appl. No.: 17/656,095

(22) Filed: Mar. 23, 2022

Related U.S. Application Data

(60) Provisional application No. 63/164,628, filed on Mar. 23, 2021.

(51) Int. Cl.
*B32B 37/00* (2006.01)
*B32B 37/10* (2006.01)

(52) U.S. Cl.
CPC .......... *B32B 37/0053* (2013.01); *B32B 37/10* (2013.01); *B32B 2457/20* (2013.01); *B32B 2551/00* (2013.01)

(58) Field of Classification Search
None
See application file for complete search history.

(56) References Cited

U.S. PATENT DOCUMENTS

| | | | |
|---|---|---|---|
| 4,435,047 A | 3/1984 | Fergason | |
| 4,605,284 A | 8/1986 | Fergason | |
| 4,676,862 A * | 6/1987 | Kuehnert | B32B 37/1054 |
| | | | 100/168 |

| | | | |
|---|---|---|---|
| 4,685,771 A | 8/1987 | West et al. | |
| 4,688,900 A | 8/1987 | Doane et al. | |
| 4,707,080 A | 11/1987 | Fergason | |
| 5,188,651 A * | 2/1993 | Csehi | C03B 35/164 |
| | | | 65/289 |
| 5,270,843 A | 12/1993 | Wang | |
| 9,690,174 B2 | 6/2017 | Wang | |
| 9,921,425 B2 | 3/2018 | Wang | |
| 2002/0014509 A1* | 2/2002 | Kitai | B65H 20/02 |
| | | | 226/177 |
| 2003/0188832 A1* | 10/2003 | Ripley | B32B 37/0053 |
| | | | 156/555 |
| 2005/0044677 A1* | 3/2005 | Colson | B32B 5/26 |
| | | | 28/101 |
| 2012/0160422 A1* | 6/2012 | Mori | B32B 37/10 |
| | | | 156/391 |
| 2015/0273807 A1* | 10/2015 | Mader | B32B 37/0053 |
| | | | 156/580 |

(Continued)

FOREIGN PATENT DOCUMENTS

WO WO-2020203124 A1 * 10/2020 ....... B32B 17/10018

*Primary Examiner* — Michael N Orlando
*Assistant Examiner* — Abhishek A Patwardhan
(74) *Attorney, Agent, or Firm* — Fish & Richardson P.C.

(57) ABSTRACT

A lamination apparatus uses pneumatic balancing force(s) to eliminate or reduce unevenly distributed forces applied on the lamination rollers. The lamination apparatus includes a first lamination roller, a second lamination roller positioned parallel to the first lamination roller, and a repositioning device configured to adjust a gap between the first lamination roller and the second lamination roller. The lamination apparatus further includes one or more pneumatic devices configured to apply forces on the first lamination roller and/or the second lamination roller.

9 Claims, 5 Drawing Sheets

(56)                   References Cited

U.S. PATENT DOCUMENTS

| | | |
|---|---|---|
| 2015/0275090 A1 | 10/2015 | Wang |
| 2016/0243773 A1 | 8/2016 | Wang |
| 2019/0275778 A1* | 9/2019 | Inagaki ..................... B32B 7/12 |
| 2022/0161524 A1* | 5/2022 | Sato ........................ B29C 65/50 |

* cited by examiner

PRESSURE BALANCED FILM LAMINATOR AND METHODS FOR MAKING AND USING

CROSS-REFERENCE TO RELATED APPLICATION

This application claims priority to U.S. Provisional Patent Application No. 63/164,628, filed on Mar. 23, 2021, the disclosure of which is hereby incorporated by reference in its entirety.

FIELD

The present specification is directed toward the lamination process and apparatus in general, and more particularly to high precision lamination systems and methods for film lamination. The process and apparatus described herein can be used in fabricating high-precision optical devices such as liquid crystal microdroplet (LCMD) devices, suspended particle devices (SPD), and electrochromic or thermochromic materials.

BACKGROUND

A film laminator can be used for fabricating thin films. Although film laminators are widely used in various industries, the mechanical principles used in existing film laminators are associated with inherent disadvantages and limitations, and cause poor product quality and/or low yield for applications requiring high-precision fabrication of films. Examples of such applications include fabricating films used in optical and display devices, such as films used in liquid crystal microdroplet (LCMD) devices.

In general, liquid crystal microdroplet (LCMD) devices include three types with different methods to form active layer structures. One approach to obtaining dispersed microdroplets in a polymer matrix is the method of encapsulating or emulsifying the liquid crystals and suspending the liquid crystals in a film that is polymerized. This approach is described, for example, in U.S. Pat. Nos. 4,435,047; 4,605,284; and 4,707,080. LCMD devices may also be formed by polymer dispersed liquid crystal (PDLC) technology or a phase separation of low-molecular weight liquid crystals from a prepolymer or polymer solution to form microdroplets of liquid crystals. This process is described in U.S. Pat. Nos. 4,685,771 and 4,688,900, LCMD devices may also formed by non-linear polymer dispersed liquid crystal display (NPD-LCD) technology. This process is described, for example, in U.S. Pat. Nos. 5,270,843 and 9,690,174 B2 and 9,921,425 B2 and US Patent Publication No. 2015/0275090 A1 and No. 2016/0243773 A1. The LCMD displays have several advantageous properties, for example, an LCMD display can be made in a form of a film in a large size or in a curved shape, which can be easily customized and incorporated into a device.

An LCMD film includes a liquid crystal matrix layer. The liquid crystal matrix layer is termed an active layer, and is responsible for the switching function of the LCMD film. The LCMD film can further include one or more transparent film layers and ITO coatings. Other types of switchable film, for example, suspended particle devices (SPD), electrochromic materials, or thermochromic materials, have a similar structure but different active layers.

The optical performance of an LCMD device depends on the precision, e.g., the consistent and precise thickness, of the LCMD film. Improved lamination process and apparatus are needed to improve the quality and yield in producing high precision optical devices or film displays, including devices using the LCMD films or similar optical films such as SPD films, electrochromic films, or thermochromic material films.

SUMMARY

This specification describes a film lamination process and a film lamination apparatus for high precision and high capability lamination. The techniques described in the specification eliminate or reduce the uneven distribution of forces during lamination by adding balancing forces on the lamination rollers. The described techniques can be used for applications requiring high-precision and/or high capability fabrication of films or film-type of products. Examples of such applications include fabricating films used in optical and display devices, such as LCMD films.

In one innovative aspect, this specification describes a lamination apparatus that uses pneumatic balancing force(s) to eliminate or reduce uneven forces applied on lamination rollers. In particular, the lamination apparatus includes a first lamination roller, a second lamination roller positioned parallel to the first lamination roller, and a repositioning device configured to adjust a gap between the first lamination roller and the second lamination roller. The lamination apparatus further includes one or more pneumatic devices configured to apply forces on the first lamination roller and/or the second lamination roller.

In some implementations, the lamination apparatus further includes at least one wheel coupled to each of the pneumatic devices.

In some implementations, the lamination apparatus further includes a distribution roller positioned between the pneumatic device and the first lamination roller or the second lamination roller. In some implementations, the distribution roller can be a hollow metallic roller. In some implementations, the distribution roller can be a solid plastic roller.

In some implementations of the lamination apparatus, the pneumatic devices include a first set of pneumatic devices distributed along a length of the first lamination roller and configured to apply forces on the first lamination roller and a second set of pneumatic devices distributed along a length of the second lamination roller and configured to apply forces on the second lamination roller.

In some implementations of the lamination apparatus, one or more of: the first lamination roller, a core of the first lamination roller, the second lamination roller, or a core of the second lamination roller, are made of metal.

In another innovative aspect, this specification discloses a new lamination mechanism, which does not include any uneven force in lamination, therefore, solving long-lasting problems and limitations associated with the uneven forces.

The details of one or more implementations of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

The present specification is best understood from the following detailed description when read with accompanying figures. It is emphasized that, in accordance with the standard practice in the industry, various features are not drawn to scale and are used for illustration purposes only.

In fact, the dimension of the various features may be arbitrarily increased or reduced for clarity of discussion.

DETAILED DESCRIPTION

Figure 1:
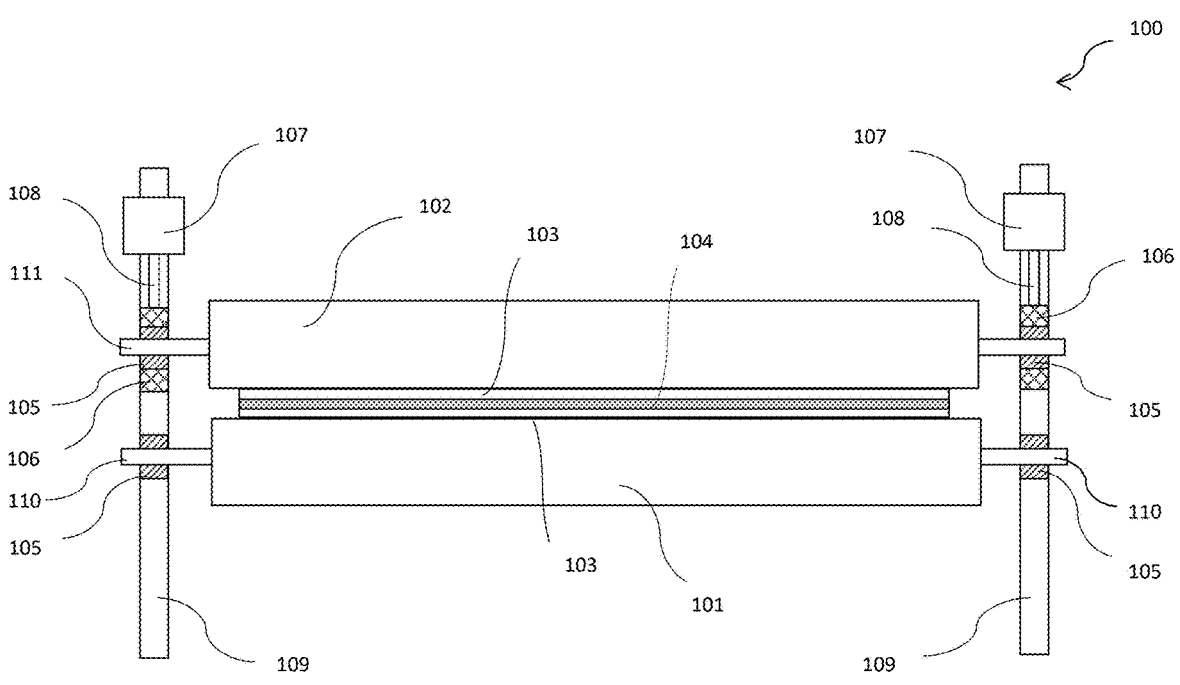
FIG. 1 is a cross-sectional view of a conventional film laminator.

The following description provides many different embodiments, or examples, for implementing different features of the described apparatus or process. Specific examples of components and arrangements are described below to simplify the present specification. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present specification may repeat reference numerals and/or letters in the various examples. This repetition is for simplicity and clarity and does not in itself dictate a relationship between the various embodiments and/or configurations discussed.

FIG. 1 shows a cross-sectional view of an example conventional film laminator 100 with working materials. The film laminator 100 includes two lamination rollers 101 and 102 configured parallel to each other. The axle shaft 110 of the lamination roller 101 is fixed on a machine wall 109 with the bearing 105, and the lamination roller 101 can be considered as a fixed roller. The axle shaft 111 of the lamination roller 102 is mounted on the slider 106 with the bearing 105, and the lamination roller 102 can be considered as a movable roller controlled by a pneumatic cylinder 107 through a shaft 108 of the pneumatic cylinder 107. The laminator 100 includes a pair of pneumatic cylinders 107 configured to reposition the movable lamination roller 102 to an open position for loading the working materials, or to a close position for lamination. The pneumatic cylinders 107 are also configured to apply lamination pressure to the working material during lamination. The lamination pressure may be precisely controlled by a pressure provided to the pneumatic cylinders 107 through a pneumatic regulator.

During lamination, the fixed roller 101 and the movable roller 102 rotate about their respective axles 110 and 111, while the working materials pass through a gap between the fixed roller 101 and the moving roller 102. The working materials can include two film layers 103 and center layer 104 between the two film layers 103. The center layer 104 can be an active material, such as an optically active material or glue-like material. The film layers 103 receive a lamination pressure from the lamination rollers to cause the two film layers 103 and the center layer 104 to be laminated together.

For various applications, the film layers can be different types of sheet materials, such as plastic, paper, wood, metal foil, or sheet metal. The active materials can be a glue, or mixture of monomers and other optically active materials, such as liquid crystals. A force, for example, generated by the pneumatic cylinder 107 can be normally applied at each of the two ends of roller axle shaft 111. The pressure transfers to the film layer 103 through the rigid cores of the lamination rollers 101 and 102. In some implementations, the outer layer of the lamination roller and the core or axle shaft of the lamination roller can be of the same material, e.g., both the outer layer and the axle shaft can be made from the same metal. In some other implementations, the outer layer and the core or axle shaft of the lamination roller can be different materials, e.g., the lamination roller can have a metal core and a rubber outer layer.

The structure and operation of the film laminator 100 described above have been widely used in various industries. However, the working principles of the conventional film laminator 100 are associated with serious disadvantages for fabricating products with high precision (e.g. micrometer or nanometer level precision) requirements. For example, the structural rigidity of the components of the conventional film laminators may fail when trying to meet a high level of precision requirement. In addition, the rigidity of the lamination rollers becomes inadequate with the increasing widths of the laminators.

In particular, the conventional film laminators cannot provide consistent output for high precision lamination with micrometer or nanometer levels of precision. Uneven thickness is one of the major quality problems on laminated products. A high-quality lamination requires an even lamination pressure across the entire width of the film laminator (i.e., in the direction along the lamination rollers). However, the lamination rollers of a conventional film laminator can be slightly bent by the lamination pressures, causing various defects in the laminated product (e.g., the laminated film) on the micrometer levels. For example, a common defect is that the laminated film is thicker in the center area compared to the edge areas along the direction of the lamination rollers.

Figure 2:
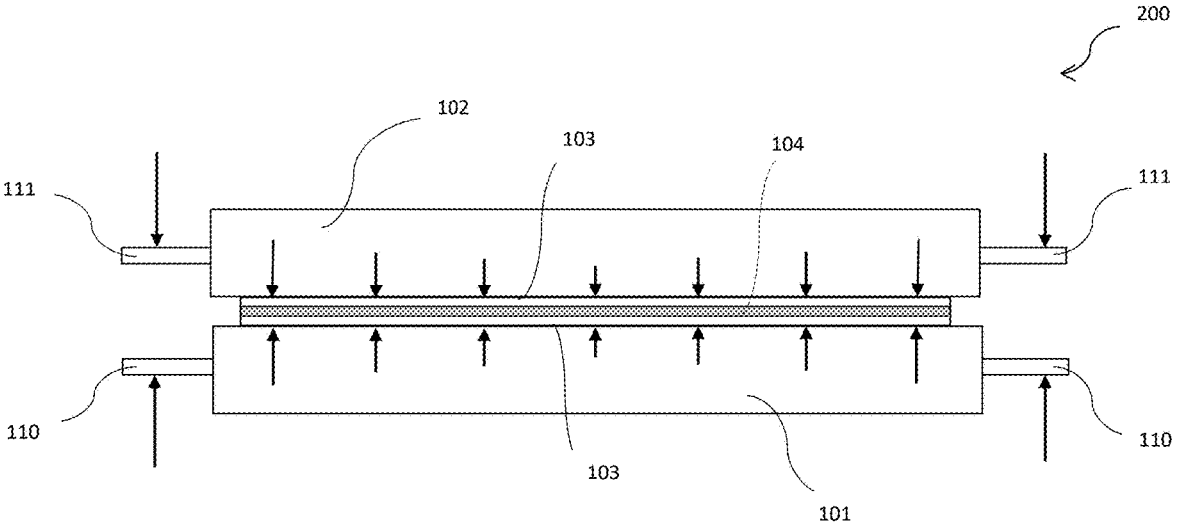
FIG. 2 is a cross-sectional view of force analysis on a conventional film laminator.

FIG. 2 shows a force analysis for the operation of the conventional film laminator 100. The arrows illustrate the forces applied to the axle shafts 110 and the distributed forces applied by the rollers 101 and 102 to the working material during lamination. The lengths of the arrows illustrate the relative strengths of the forces. As shown in FIG. 2, the main forces (illustrated by the left-most and right-most arrows) are applied to the axle shafts 111. The forces distributed on the lamination rollers are not uniform. The center portions of lamination rollers apply relatively less pressure (forces per unit area) to the working materials, while the end portions of the lamination rollers apply relatively greater pressures to the working materials. This uneven distribution of pressure causes the lamination rollers to be bent, with a bigger gap between the center portions of the lamination roller 101 and 102. The bending of the rollers 101 and 102 can be on the micrometer scale, and thus is not visibly shown in the figures. However, the micro-level bending of the rollers can have a significant impact on the quality of the laminated film if high precision is required.

The film layers 103 can be solid materials while the center material 104 can be a liquid or a semi-liquid material such as glue. During the lamination process, the active material 104 can be squeezed out from the lamination area when pressure is applied to the working materials.

For optical films used in optical devices, the thickness of the active material is critical, and the viscosity of active material can be low. The thickness of active material (i.e., the cell thickness or cell gap) can be controlled by solid spacers (not shown) mixed with active material.

When the active material near the edge areas is completely squeezed out, the two film layers 103 are in contact with each other, and the bending of the lamination rollers can become more significant with support from the rigid edges of film layers 103.

The bending of the lamination rollers 101 and 102 can cause various problems in the laminated film. The edge areas of the film can be thinner than the required thickness in the specifications. This causes a phenomenon termed the "bubble tree" in the industries, i.e., tree-shaped air channels due to over-pressed lamination pressure. Further, the center area of the laminated film can be thicker than the specified thickness. These aberrations from the product specifications can significantly impact the optical performance of the film.

Several approaches have been developed to reduce the negative effects associated with the bending of the rollers, including the use of more rigid materials to make lamination rollers, such as using stainless steel instead of steel, increasing the diameters of rollers, and using a solid instead of a hollow structure for the rollers. However, these approaches do not completely remove the problems discussed above and can cause other disadvantages such as difficulties in fabricating the rollers, difficulties in controlling the operation of the film laminator, and/or increased cost. Another approach is to use rollers with a greater diameter in the center portions of the rollers to compensate for the effect of bending. However, such rollers can only work with a fixed speed. Another widely used approach to reduce the negative effects caused by the bending of the rollers is to only use a portion of the width of the film laminator (e.g., half or less of the length of the rollers) to perform lamination. However, since the full width of the film laminator is not used, the length of the rollers may need to be increased to accommodate the width of the laminated film, and the greater length causes increased flexibility of the rollers which become counterproductive.

Thus, none of the existing approaches adequately solve the problems associated with the bending of the rollers for applications that require high-precision and/or greater width of the laminated film. In fact, the poor performance of the film laminator has become a bottleneck for fabricating wider and/or thinner film or sheet products, such as large LCMD film or liquid crystal smart film, PET (polyethylene terephthalate) film, and super thin glass.

This specification describes several solutions to the longlasting problems of conventional film laminators discussed above. As discussed with reference to FIG. 2, an important reason causing the inadequate performances of conventional film laminators is the non-uniform forces applied to the lamination rollers 101 and 102. Thus, the techniques described in this specification aim to apply balanced forces to the lamination rollers.

Figure 3:
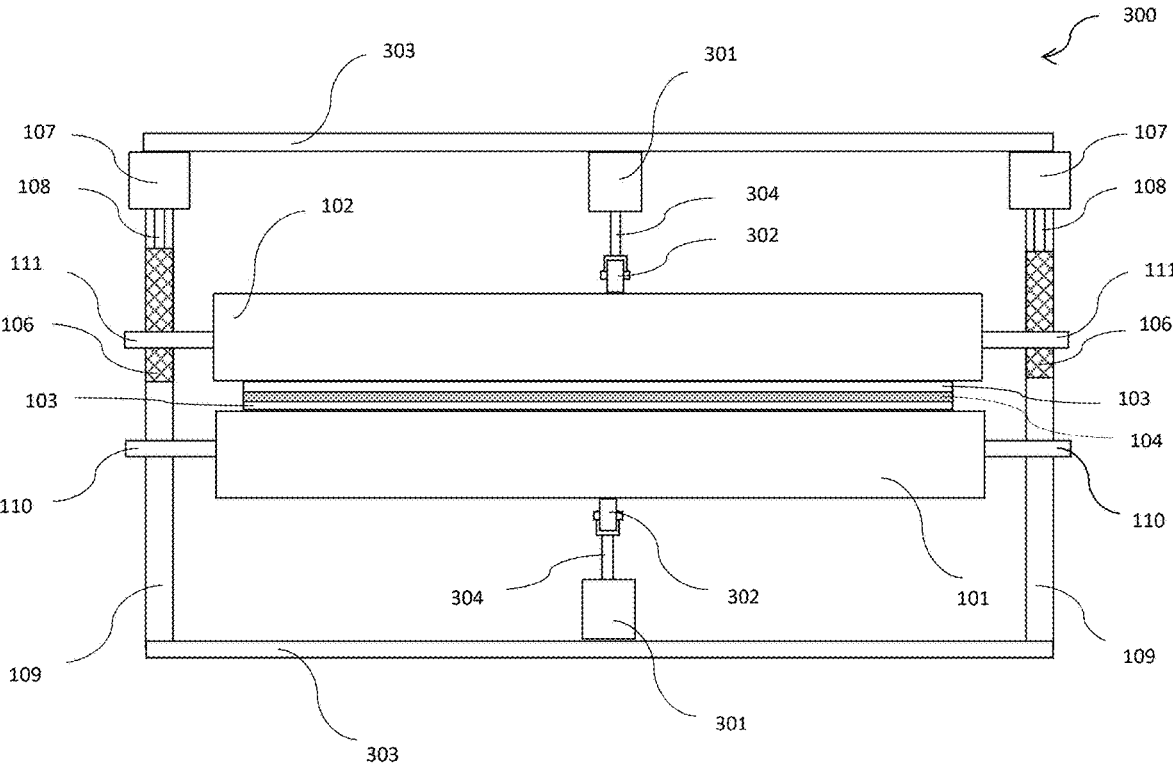
FIG. 3 is a cross-sectional view of an improved film laminator according to implementations of this specification.

FIG. 3 shows an example of a film laminator 300 according to certain embodiments. The film laminator 300 includes two lamination rollers 101 and 102 configured parallel to each other. The axle shaft 110 of the first lamination roller 101 can be fixed on a machine wall 109, and the lamination roller 101 is regarded as the fixed roller. The axle shaft 111 of the lamination roller 102 is mounted on a slider 106 configured to extend or retract to control the gap between the lamination rollers 101 and 102 and lamination pressure. Bearings coupled with axle shafts 110 and 111 are not shown in FIG. 3 for clarity of illustration. The movable roller 102 can be repositioned via the slider 106 by the two pneumatic cylinders 107 to an open position for loading working materials, or to a close position for lamination. As shown in FIG. 3, the laminator 300 can include two pneumatic cylinders 107 configured to move the two respective ends of the axle shaft via the respective sliders 106.

The film laminator 300 further includes one or more additional pneumatic cylinders 301. The additional pneumatic cylinders 301 are termed as "balancing pneumatic cylinders" with reference to FIG. 3 for convenience of description. The balancing pneumatic cylinders 301 can be divided into sets and with each set respectively mounted on one of the two fixed mounting bars 303. Each balancing pneumatic cylinder 301 can be coupled to a wheel 302 via a piston rod 304 of the balancing pneumatic cylinder 301. Each set of the balancing pneumatic cylinders 301 provides a balancing force to one of the lamination rollers to compensate for the lower lamination pressure in the center portions of the lamination rollers 101 and 102.

In the example shown in FIG. 3, the wheel 302 is in contact with the lamination roller 101 or 102, and the balancing pneumatic cylinder 301 is configured to provide a balancing force to the lamination roller through the wheel 302 and the piston rod 304 of the balancing pneumatic cylinder 301. Also shown in FIG. 3, in some implementations, the film laminator 300 can include two balancing pneumatic cylinders 301 respectively coupled with two wheels 302. One set of the balancing pneumatic cylinders 301 are configured to apply a force on the first lamination roller 101, and the other set of the pneumatic cylinders 301 are configured to apply a force on the second lamination roller 102. In some implementations, as shown in FIG. 3, the balancing pneumatic cylinders 301 can be configured in to apply the force to center portions of the lamination rollers 101 and 102.

The balancing forces applied to the center portions of the lamination rollers can compensate the reduced pressure in the center areas, due to a bending of the lamination rollers, and thus improve the pressure distribution on the lamination rollers over the uneven pressure distribution illustrated in FIG. 2 where the center portions of the lamination rollers receive weaker forces. That is, by applying additional forces to the center portions of the rollers 101 and 102 using the balancing pneumatic cylinders 301 coupled with the wheels 302, the pressure applied to the lamination rollers is more evenly distributed. This improvement in pressure distribution reduces the bending of the lamination rollers 101 and/or 102, and thus improves the precision of the lamination of the film.

The lamination rollers 101 and 102 can be constructed with any appropriate materials or combination materials according to the specific applications. In one example, the lamination rollers 101 and 102 can be constructed with a metal. In another example, the lamination roller 101 or 102 can include an inner core constructed with a first material (e.g., a metal) and an outer layer constructed with a second material (e.g., rubber). The outer layer of the lamination roller 101 or 102 can have a high precision surface finishing, such as a mirror finishing. In order to protect the surfaces of the lamination rollers, the wheel 302 can be constructed with a softer material, e.g., a plastic or rubber, and/or can include a cover that is made of a softer material, such as a plastic or rubber cover. In one particular example, the wheel 302 is constructed with a metal and has an outer cover that is constructed with plastic or rubber.

Figure 4:
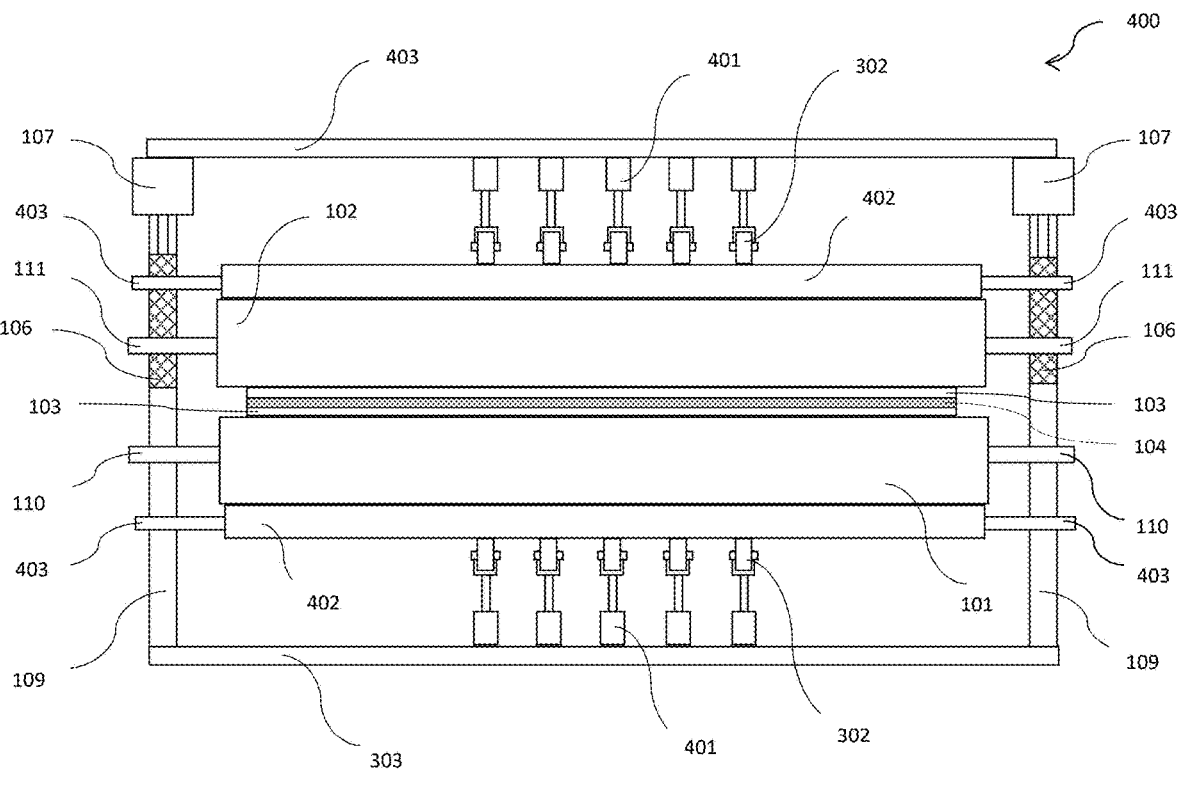
FIG. 4 is a cross-sectional view of an improved film laminator according to implementations of this specification.

FIG. 4 shows the cross-sectional view of an example film laminator 400 according to some other implementations of this specification. The film laminator 400 can include two sets of balancing pneumatic cylinders 401 with each set of balancing pneumatic cylinders 401 mounted on one of the two fixed mounting bars 303. Each set of balancing pneumatic cylinders 401 are configured to apply forces to the center portions of the lamination roller 101 or 102 through a distribution roller 402. Total forces applied by the balancing pneumatic cylinders 401 can balance the deformation of the lamination rollers caused by two pneumatic cylinders 107 that are configured to reposition and press on the movable roller 102. Using the distribution rollers 402 may effectively protect the surface of lamination rollers 101 and 102 and distribute the balanced forces more evenly. This improvement in pressure distribution reduces the bending of the lamination rollers 101 and 102, and thus improves the precision of the lamination of the film.

The distribution roller 402 can be a hollow stainless-steel roller with a mirror finishing of a polished surface. In another example, the distribution roller 402 can be a solid plastic roller. In general, the distribution roller can be fairly rigid, but also has a low-level flexibility. The mounting mechanism for the distribution roller 402 can be a slide mounted on the wall 109 or a smaller slider mounted on the slider 106 or simply using a long slot on the wall 109 for shifting of the axle shaft 403 of the distribution roller 402.

In the particular configuration shown in FIG. 4, the wheels 302 are in contact with the distribution roller 402, and the distribution roller 402 is in contact with the lamination roller 101 or 102. Thus, the balancing pneumatic cylinders 401 exerts forces, via the wheels 302 and the distribution roller 402, on the lamination rollers 101 and 102 to improve the pressure distribution on the lamination rollers. Compared the example 300 shown in FIG. 3, the distribution roller 402 further improves the pressure distribution because for the laminator 400, the balancing forces are more evenly distributed on the center portions of the lamination rollers 101 and 102. Additionally, the lamination rollers are better protected because direct contact with the wheels 302 is avoided.

Figure 5A:
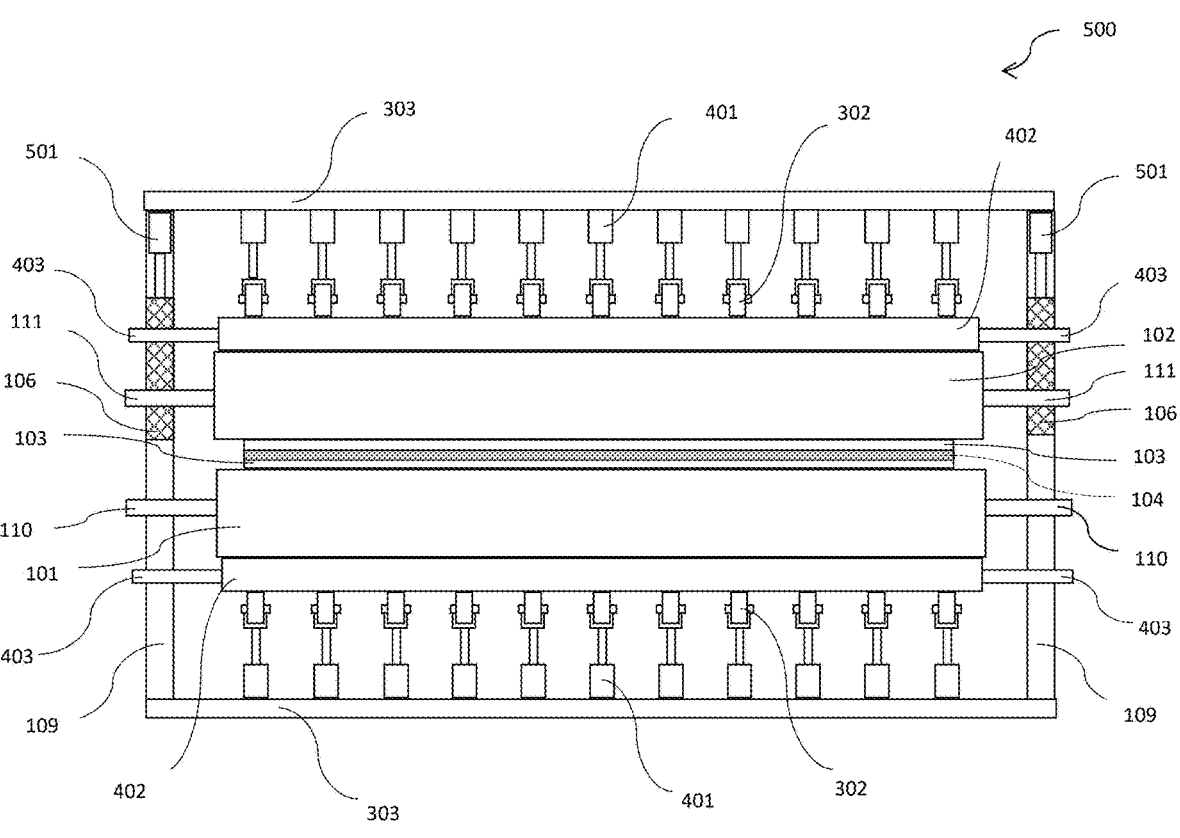
FIG. 5A is a cross-sectional view of an improved film laminator according to implementations of this specification.
Figure 5B:
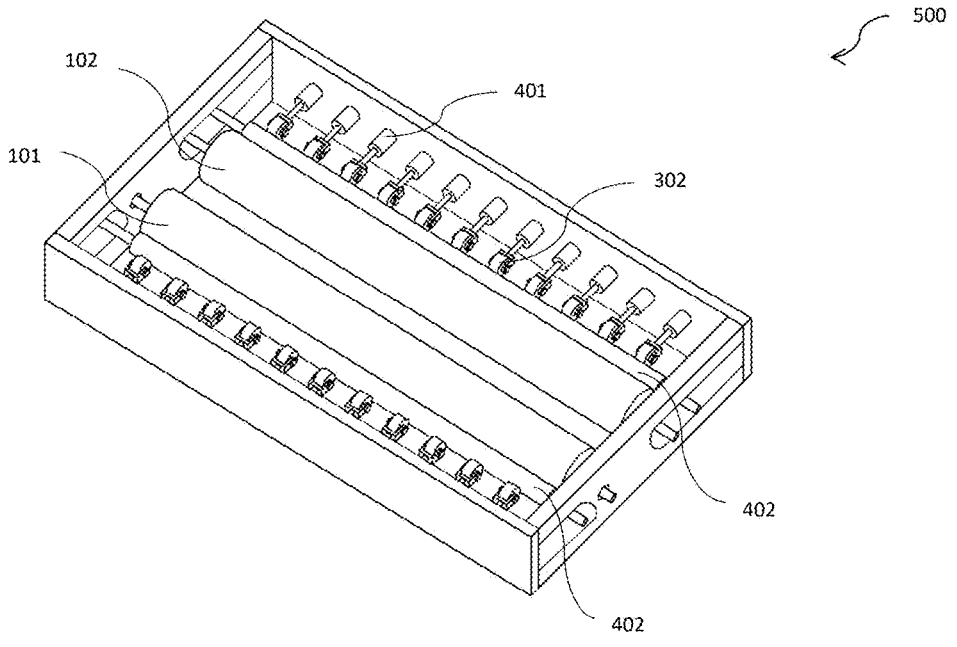
FIG. 5B is an isometric view of the improved film laminator in FIG. 5A.

FIGS. 5A and 5B show another example film laminator 500 in cross-sectional view (FIG. 5A) and isometric view (FIG. 5B) according to certain implementations of this specification. The film laminator 500 includes two lamination rollers 101 and 102 configured parallel to each other. The axle shaft 110 of the first lamination roller 101 can be fixed on a machine wall 109 with bearings (not shown), and the first lamination roller 101 is regarded as the fixed roller. The axle shaft 111 of the second lamination roller 102 is mounted on a slider 106 with bearings (not shown). The slider is controlled by the pneumatic cylinder 501. The movable roller 102 can be repositioned via the slider 106 by a pair of pneumatic cylinders 501 to an open position for loading working materials, or to a close position for lamination.

As shown in FIG. 5A, the laminator 500 can include two pneumatic cylinders 501 configured to move the two respective ends (the left end and the right end) of the axle shaft 111 via the respective sliders 106. The film laminator 500 includes two sets of balancing pneumatic cylinders 401, which each set of balancing pneumatic cylinders 401 mounted on one of the fixed mounting bars 303, respectively. Each balancing pneumatic cylinder 401 is coupled with a wheel 302. In the examples shown in FIG. 5A and FIG. 5B, the two sets of balancing pneumatic cylinders 401 include a first set of balancing pneumatic cylinders positioned below the row of balancing pneumatic cylinders positioned below the lamination roller 101 in FIG. 5) and a second set of balancing pneumatic cylinders 401 (the row of balancing pneumatic cylinders positioned above the second lamination roller 102 in FIG. 5). The first set of balancing pneumatic cylinders 401 are distributed along a direction parallel to the first lamination roller 101 to apply forces to the first lamination roller 101. The second set of balancing pneumatic cylinders 401 are distributed along a direction parallel to the second lamination roller 102 to apply forces to the second lamination roller 102. Each of the first set and the second set of pneumatic cylinders 401 can be positioned with equal or different distance intervals along the respective lamination rollers 101 or 102.

Figure 6:
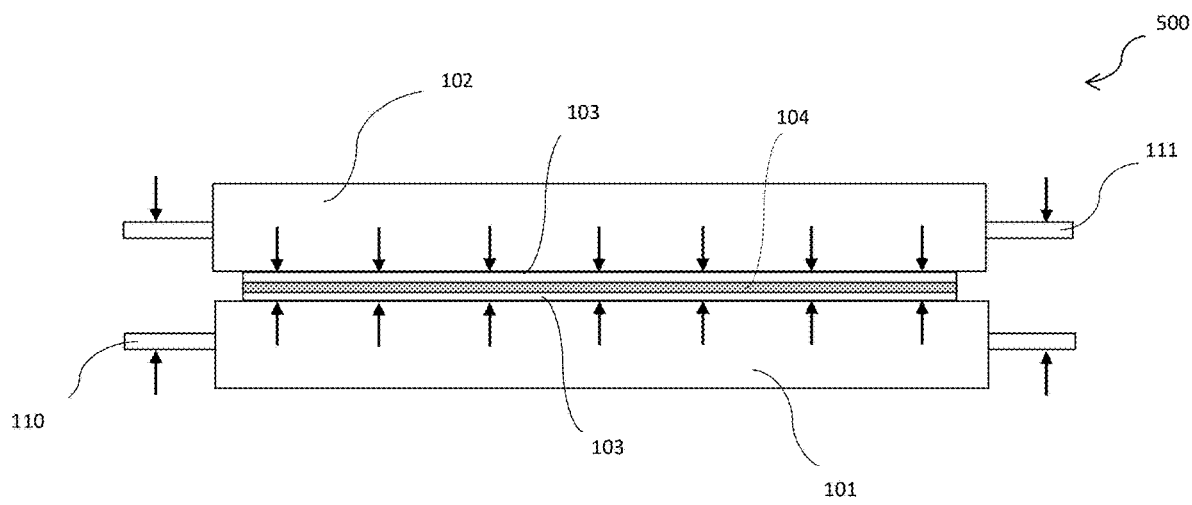
FIG. 6 is a cross-sectional view of force analysis on an improved film laminator.

FIG. 6 illustrates a force distribution during the lamination process of the laminator 500 with reference to FIG. 5. As shown in FIG. 6, the forces applied to the lamination rollers are evenly distributed, while the forces applied on axle shafts 111 only need to be enough for positioning the lamination rollers. An important advantage for such feature is that this feature overcomes the problem caused by unevenly distributed forces applied on the lamination rollers, and thus avoiding the bending of the lamination rollers. The working materials can receive a uniform lamination pressure across an entire width of the laminator. As an additional advantage, the laminator 500 does not rely on and is not limited by the shapes or materials of lamination rollers, and further overcomes the limitation of the width of a conventional laminator. The lamination mechanism adopted by the laminator 500 can be readily adapted to very long laminator rollers for producing very wide laminated products.

By applying forces at positions evenly distributed along the lengths of lamination rollers 101 and 102 using the balancing pneumatic cylinders 401 coupled with the wheels 302, the pressure applied to the lamination rollers is more evenly distributed. When pneumatic cylinders 501 are only for positioning the lamination roller 102 and lamination pressure are evenly provided by balancing pneumatic cylinders 401, the laminator 500 can eliminate uneven distribution of the lamination force or pressure applied to the working materials (103 and 104). This improvement in pressure distribution eliminates uneven forces applied on the lamination rollers 101 and 102, therefore, there is no bending of the lamination rollers 101 and 102 occurred, thus improving the precision of the lamination of the film.

Since the laminator 500 can provide an even lamination pressure on the working materials in lamination, the speed of lamination can be greatly increased, because of avoiding any force to shift the working materials to one side, the efficiency of lamination is thereby improved. Due to the compressibility of the balancing pneumatic cylinder 401, the laminator 500 also has a greater tolerance on the flatness of the working material. For example, if there are small particles on the surface of the working material or if the film 103 includes a protection sheet (also called a liner which usually does not have high precision in thickness), the laminator 500 can provide greater tolerance in working with the change of thickness, because the balancing pneumatic cylinders 401 can provide a constant pressure, regardless the change in thickness of the working materials. Therefore, the yield of production can be improved.

Although the pneumatic cylinders 501 can be any suitable type of pneumatic cylinders, the pneumatic cylinders 501 used for the laminator 500 can be smaller in size compared to the pneumatic cylinders used in a conventional film laminator (e.g., the pneumatic cylinder 107 in the example shown in FIG. 1). This is because, in the configuration of the laminator 500, the function of the pneumatic cylinders 501 is for positioning the lamination roller 102. They are not required to provide the applied lamination force to the working materials. This is different from a conventional laminator. The pneumatic cylinders 107 used in a conventional laminator shown in FIG. 1 are configured to apply lamination pressure to the working material in addition to repositioning the movable roller. By comparison, the pneumatic cylinders 501 for the laminator 500 are configured to mainly perform the function of repositioning the movable roller 102. The lamination pressure can be provided mainly by the sets of balancing pneumatic cylinders 401. Therefore, initially provided forces are evenly distributed across the entire length of lamination rollers 101 and 102. When the pneumatic cylinders 501 are only required to provide a function for positioning the second lamination roller 102, they can be replaced by other types of motion mechanisms and devices, such as a spring, an actuator, or a linear motor. That is, the pneumatic cylinders 501 can be replaced by any suitable repositioning device configured to reposition the lamination roller 102 and change the gap size between the lamination roller-101 and lamination roller 102.

Through a pair of pressure distribution rollers 402, pressure applied to the lamination rollers 101 and 102 and working materials is evenly distributed, eliminating the cause for bending the lamination rollers 101 and 102. Thus, a higher precision lamination becomes possible. The pressure distribution roller 402 can protect lamination rollers, especially when the outer layers of lamination rollers are constructed with fragile materials such as rubber, or when the lamination rollers have high precision finishing such as mirror finishing. In this configuration, when the lamination pressure is changed for handling laminations of different working materials, forces applied to the rollers and the working material can still be evenly distributed over the entire width of the working material.

Different active materials in the center layer 104 can have different viscosities. To handle the different viscosities of the active materials, the lamination speed, i.e., a moving speed of the working materials, may need to be changed, because reducing lamination speed can have a similar effect as increasing the lamination pressure, or increasing the lamination speed can have a similar effect as reducing the lamination pressure. Compared to a conventional laminator, the laminator 500 has greater capability to handle different working materials by adjusting pressure for pneumatic cylinders 401 and lamination speed by adjusting the rotating speed of the lamination rollers 101 and 102. It is possible to have the same lamination speed for different working materials. The feature of maintaining the same lamination speed for different working materials is difficult to achieve using the conventional laminator 100. This feature is advantageous for mass production in an automatic production line, because the lamination process is usually only one of multiple steps of the production process, and maintaining the same lamination speed eliminates the need for changing the speed for the other steps and apparatuses in the production line.

The limitation in the product width using a conventional laminator has become a long-lasting bottle-neck for continuous improvement in many industries. Using the improved laminator described above, the width of the laminator or the lengths of lamination rollers are no longer limited due to the even distribution of the lamination forces and no roller bending. Theoretically, there is no width limitation to implement the improved laminator described in the specification. It is possible to make a very wide laminator with very long lamination rollers by using the techniques described herein. When lamination rollers are very long (e.g., 20 meters long), the lamination rollers can become more flexible, but a plurality of pneumatic cylinders 401 distributed in relatively short distances can ensure a high linearity of the lamination rollers in any portions of the lamination rollers used for lamination. This will be very helpful for many industries, such as the fabrications of films, thin glass, and thin sheet metals.

In some implementations, the balancing pneumatic cylinders 401 can be individually adjusted and controlled. When the width of working materials is changed from a full width to a narrow width, e.g., only half or ⅓ of film laminator width, some of the balancing pneumatic cylinders 401 positioned closer to the ends of the rollers can be turned off or have a reduced pressure, leaving the balancing pneumatic cylinders positioned in the center portions to provide lamination forces. A computer system can be used to control the operation of each balancing pneumatic cylinder 401 to adjust its applied force. By using predetermined optimized force data, the computer system can control each balancing pneumatic cylinder 401 to exert a respective lamination force value based on the optimized force data, to achieve an improved precision level for lamination of a particular working material. The optimized force data can be obtained through experimentation and/or computer simulation to achieve optimal precision for the particular working material.

In order to clearly describe the features and the advantages of the techniques, this detailed description follows an incremental process by first showing the existing problems in a conventional film laminator with reference to FIG. 1 and then illustrating how different implementation features can be used to improve the performance of the laminator with references to FIG. 3 and FIG. 4. The example of the laminator shown in FIG. 5 eliminates the causes for bending of the lamination rollers, and thus further improves the lamination quality and yield. It should be understood that the different implementation features described with respect to the different examples can also be combined and arranged into a variety of combinations.

Further, the technical scope of this specification is not limited to the scope in the above examples. It should be clear to a person skilled in the art that various modifications or improvements can be made to the above examples. For example, the lamination roller 101 does not have to be a fixed roller. It is possible for both lamination rollers 101 and 102 to be movable rollers.

In summary, this specification describes new structures, methods, and principles to eliminate or reduce uneven forces in a lamination process. With improved balanced forces or evenly distributed forces, the precision level of lamination can be improved to a higher level of product quality. Increasing the width of the film laminator or increasing the width of the laminated product can be achieved, because described structures for the laminators allow for increasing the widths of lamination to very large dimensions. The capability of lamination is also improved to a higher level including handling laminations for a wider range of working materials. In general, the techniques disclosed in the specification improve both the quality and applicability of the lamination process.

Suspended particle devices (SPD), electrochromic or thermochromic materials have similar applications as switchable windows and have the same problems in production. As discussed herein, the new structure, methodology, and principle will resolve similar problems in the production of those devices, and can also resolve similar problems in the rolling mill for making a thin film or sheet such as PET film and super thin glass.

What is claimed is:

1. A lamination apparatus, comprising:
a first lamination roller comprising a first rigid axle shaft having two opposite ends fixed on a frame of the lamination apparatus via two respective bearings;
a second lamination roller positioned substantially parallel to the first lamination roller and comprising a second rigid axle shaft having two opposite ends fixed on respective sliders or the frame of the lamination apparatus via two respective bearings;
a repositioning device configured to adjust a gap between the first lamination roller and the second lamination roller; and
one or more pneumatic devices configured to apply pneumatic forces on the first lamination roller or the second lamination roller in a direction that is substantially perpendicular to an axle of the first lamination roller or an axle of the second lamination roller for balancing lamination forces.

2. The lamination apparatus of claim 1, further comprising:
at least one wheel coupled to each of the pneumatic devices.

3. The lamination apparatus of claim 2, further comprising:
a distribution roller positioned between the pneumatic device and the first lamination roller or the second lamination roller, wherein the distribution roller is in contact with (i) the at least one wheel coupled to the pneumatic device and (ii) the first lamination roller or the second lamination roller during lamination.

4. The lamination apparatus of claim 1, wherein:
the pneumatic devices include a first set of pneumatic devices distributed along a length of the first lamination roller and configured to apply forces on the first lamination roller and a second set of pneumatic devices distributed along a length of the second lamination roller and configured to apply forces on the second lamination roller.

5. The lamination apparatus of claim 1, wherein:
one or more of: the first lamination roller, a core of the first lamination roller, the second lamination roller, or a core of the second lamination roller, are made of metal.

6. The lamination apparatus of claim 3, wherein the distribution roller is a hollow metallic roller.

7. The lamination apparatus of claim 3, wherein the distribution roller is a solid plastic roller.

8. A lamination apparatus for laminating flexible films, comprising:
a first lamination roller comprising a first rigid axle shaft having two opposite ends fixed on a frame of the lamination apparatus via two respective bearings;
a second lamination roller positioned parallel to the first lamination roller and comprising a second rigid axle shaft having two opposite ends fixed on respective sliders or the frame of the lamination apparatus via two respective bearings; and
one or more pneumatic devices configured to apply balancing forces on the first lamination roller or the second lamination roller in a direction that is substantially perpendicular to an axle of the first lamination roller or an axle of the second lamination roller, wherein for balancing lamination forces.

9. A lamination apparatus, comprising:
a first lamination roller comprising a first rigid cylindrical core;
a second lamination roller comprising a second rigid cylindrical core and positioned parallel to the first lamination roller;
a repositioning device configured to adjust a gap between the first lamination roller and the second lamination roller;
one or more pneumatic devices configured to apply pneumatic forces on the first lamination roller or the second lamination roller in a direction that is substantially perpendicular to an axle of the first lamination roller or an axle of the second lamination roller;
a wheel coupled to each of the pneumatic devices; and
a distribution roller positioned between (i) the pneumatic device and (ii) the first lamination roller or the second lamination roller, wherein the distribution roller is in contact with (i) the wheel coupled to the pneumatic device and (ii) the first lamination roller or the second lamination roller during lamination.

* * * * *